Sept. 23, 1952          C. W. PRIBUS          2,611,296

MOUNT FOR OPTICAL ELEMENTS

Filed April 13, 1949

CLARENCE W. PRIBUS
INVENTOR

BY Daniel I. Mayne,
Donald H. Stewart,
ATTORNEYS

Patented Sept. 23, 1952

2,611,296

UNITED STATES PATENT OFFICE 2,611,296

MOUNT FOR OPTICAL ELEMENTS

Clarence W. Pribus, Rochester, N. Y., assignor to Eastman Kodak Company, Rochester, N. Y., a corporation of New Jersey Application April 13, 1949, Serial No. 87,326

2 Claims. (Cl. 88—84)

This invention relates to mounts for optical elements and more particularly to a means for accurately holding an optical element in the desired position on a support. One object of my invention is to provide a simple type of mount for an optical element which can be readily assembled by relatively unskilled help, and which securely retains the optical element in its set position. Other objects will appear from the following specification, the novel features being particularly pointed out in the claims at the end thereof.

In the drawings, in which like reference characters denote like parts throughout:

In camera range finders, quite a material portion of the cost of the range finder is due to properly locating the optical elements, such as mirrors, lenses, and the like, in the required relationship and holding them accurately in such position, because, ordinarily, the mounting requires at least some degree of skill in setting up the optical elements. I have provided a mount in which the supporting members, if properly made, will properly position the optical elements, and in which a simple form of spring clip may be used to retain the elements in the desired locations.

Figure 1:
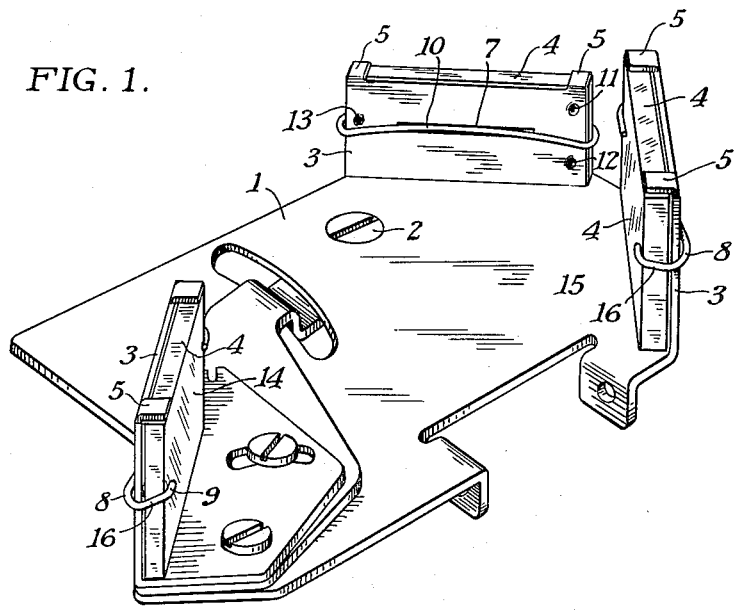
Fig. 1 is a perspective view of a portion of a camera range finder provided with mounts for optical elements constructed in accordance with and embodying a preferred form of my invention.
Figure 2:
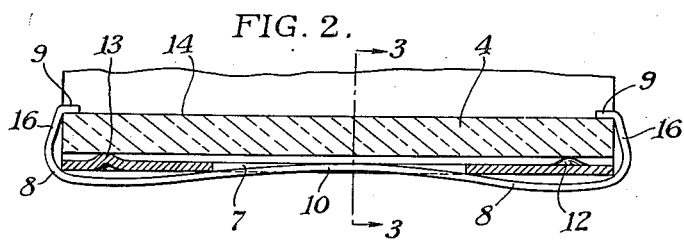
Fig. 2 is an enlarged sectional view taken through an optical element supported on my improved form of mount.
Figure 3:
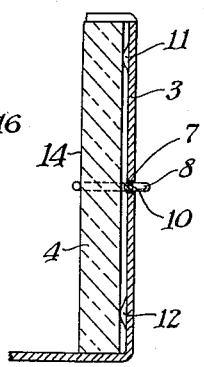
Fig. 3 is a view similar to Fig. 2 but taken on line 3—3 of Fig. 2 showing a transverse section of my mount.

More specifically, referring to Fig. 1, I may provide a mechanism plate 1 which may be attached to a camera, for instance, in a known manner, as by screws 2; this mechanism plate, in the present instance, including a series of supporting plates 3 on which optical elements 4 may be mounted. The supporting plates 3 are preferably provided with formed-over lugs 5 for holding the optical elements 4 against too great movement in a generally vertical direction. Each of these plates is preferably provided with a notch, or groove, 7 extending either into or through the support 3; the width of this slot, or notch, being substantially the same width as the diameter of a wire clip 8 which is preferably of U-shape for the extreme ends 9 bent towards each other, and preferably including a central portion 10 having a reentrant curve which may be snapped into the slot 7.

The supporting plate 3 is preferably provided with three protuberances 11, 12 and 13; two of these protuberances being arranged on one side and one on the other so as to provide a three-point support for the optical element 4. These protuberances can be arranged with the tops of the protuberances lying accurately in a plane so that the element may be accurately supported. The spring clip 8 may then be slid downwardly over the supporting plate with the inwardly bent portions 9 engaging the front surface 14 of the optical element. As here shown, the optical elements are plane mirrors, although, of course, the same construction can be used whether the optical element is flat or curved in cross section.

It is an extremely simple matter to assemble, or disassemble, these elements. The element 4 is slid beneath the lugs 5 so that the bottom edge may lie on, or slightly above, the top 15 of the mechanism plate 2. The spring clip 8 may then be slid over the optical element and support by springing the upstanding end 16 of the U-shaped portion apart and sliding the clip down until the reentrant portion snaps into the notch 7, at which time the formed-over ends 9 of the U-shaped member will engage the front surface 14 of the optical element and press it firmly against its three-point support upon the protuberances 11, 12 and 13. Such an assembly lends itself readily to disassembling, since it is only necessary to spring the wire clip 8 from the slot 7 and slide it up over the end of the support and optical element. If the supporting plates are properly formed, the elements will be accurately held in the desired position.

Having thus described my invention, what I claim is new and desire to secure by Letters Patent of the United States is:

1. A mount for optical elements of range finders for cameras comprising a rigid supporting plate having upstanding flanges, each including three protuberances having outer ends lying in a plane, each three protuberances supporting an optical element in a predetermined plane, each upstanding flange including a groove formed by a pair of spaced walls spaced apart a predetermined amount and extending into the flange and lying inside an area the outside of which is defined by the three protuberances, a spring wire clip having a central portion of a size to snugly fit into the groove and extending into a position between the spaced walls to be located by the walls extending into the flange and having ends extending about the ends of the upstanding flange and over a portion of the front face of the optical element supported on the protuberances for resiliently holding the optical element thereon.

2. A mount for optical elements of range finders for cameras comprising a rigid supporting plate having upstanding flanges, each including three protuberances having outer ends lying in a plane, each three protuberances supporting an optical element in a predetermined plane, each upstanding flange including a groove formed by a pair of spaced walls extending into the flange and lying inside an area the outside of which is defined by the three protuberances, a spring wire clip of a size to snugly fit between the spaced walls of the groove and having a central portion extending into a position in the groove and between the spaced walls to be located by the walls extending into the flange and having ends extending about the ends of the upstanding flange and over a portion of the front face of the optical element supported on the protuberances for resiliently holding the optical element thereon, each upstanding flange including lugs extending in a direction generally parallel to the supporting plate and spaced therefrom a distance slightly greater than the height of the optical element to limit movement of the optical element relative to the base.

CLARENCE W. PRIBUS.

REFERENCES CITED

The following references are of record in the file of this patent:

UNITED STATES PATENTS

| Number | Name | Date |
|---|---|---|
| 911,568 | Bickford | Feb. 9, 1909 |
| 1,027,540 | Hendricks | May 28, 1912 |